June 30, 1964 P. J. SEARS 3,138,871
SPAGHETTI FORK AND SPOON
Filed Oct. 21, 1963
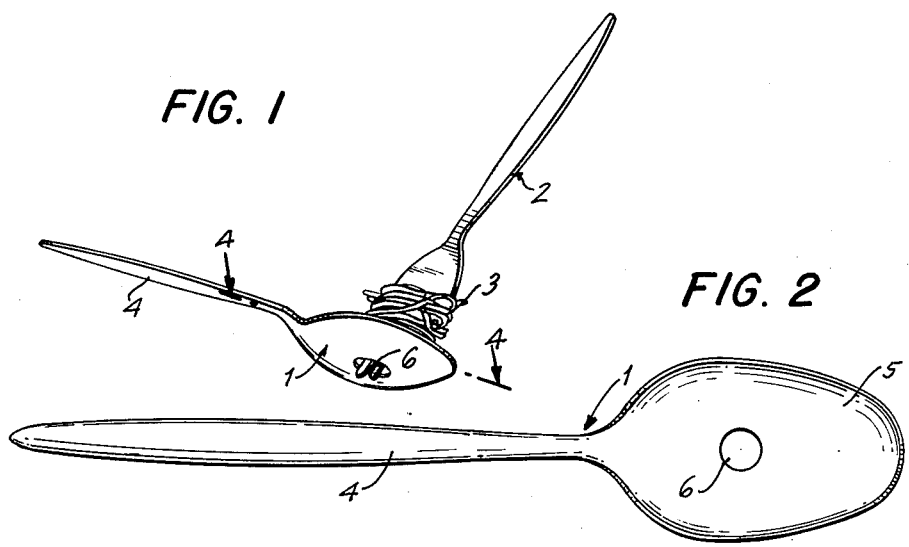
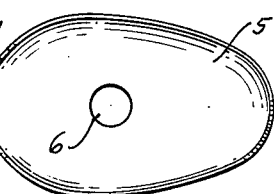
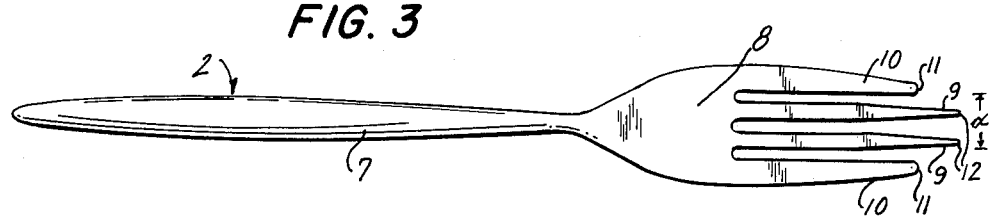
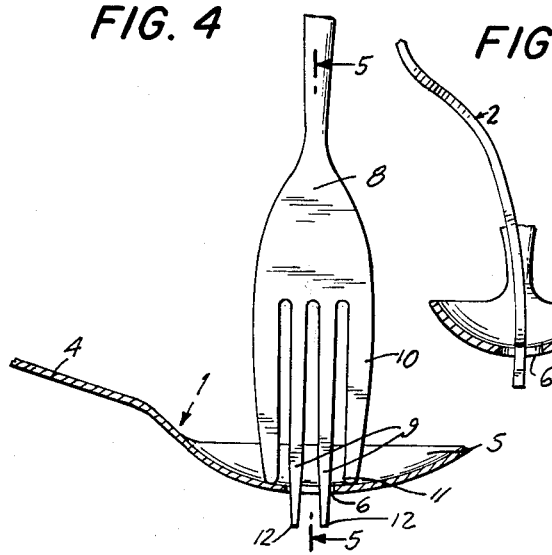
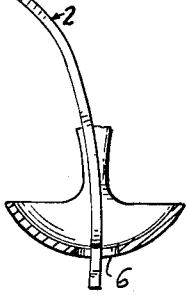
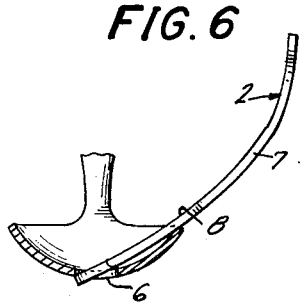
INVENTOR.
Paul Sears
BY 3,138,871
SPAGHETTI FORK AND SPOON
Paul J. Sears, Vernon, N.Y., assignor to Oneida Ltd.,
Oneida, N.Y., a corporation of New York
Filed Oct. 21, 1963, Ser. No. 317,477
2 Claims. (Cl. 30—322)

This invention relates to a spaghetti fork and spoon.

More particularly, the invention is concerned with providing a fork and spoon which interfit to facilitate the rolling up of spaghetti on the fork.

It is an object of the invention to provide a fork and spoon set of the type indicated, in which the fork is positioned with relation to the spoon bowl while permitting turning of the fork.

A second object is to provide a fork and spoon combination of the type indicated, in which the spoon permits drainage of excess liquid sauce.

A further object is to provide a fork and spoon set of the type indicated, in which the fork is useable in the ordinary way and without substantial inpairment of function.

A fork and spoon set embodying the invention in a preferred form will now be described with reference to the accompanying drawing, and the features forming the invention will then be pointed out in the appended claims.

In the drawing:

FIG. 1 is a perspective showing a fork and spoon of the invention in use;

FIG. 2 is a plan view of the spoon;

FIG. 3 is a plan view of the fork;

FIG. 4 is a section on the line 4—4 of FIG. 1, showing the fork in position in the spoon;

FIG. 5 is a section on the line 5—5 of FIG. 4, also showing the fork in the same position as in FIG. 4; and FIG. 6 is a view similar to FIG. 5, but showing the fork in another position.

FIG. 1 shows the spoon 1 as used in conjunction with the fork 2 for winding or rolling up the spaghetti indicated at 3. The spoon generally is of ordinary tablespoon size and shape, having a handle 4 and bowl 5 of usual proportions. The bowl 5, however, has a circular opening, which may be about 5/16 inch in diameter and is located centrally and at the deepest part of the bowl 5. The fork configuration as to its handle 7 and time portions 8 is of usual table fork configuration. The center pair of tines 9 are, however, longer than the outer pair of tines 10, again, by about 5/16 inch. The outer tines are of heavier construction than the center ones and have blunt, rounded ends 11 as shown. The portions of the center tines protruding beyond the blunt ends 11 fit the opening 6 with a slight clearance and their tips 12, due to the tapered form of the tines, may have a considerably clearance, as, for example, 1/16 inch, for easy insertion into the opening 6.

The distance "X" from the inside of one of the blunt tips 11 to the far side of the remote center tine 9 is considerably greater than the diameter of opening 6, as, for example, about 3/8 inch or more. In consequence, when the fork is inserted in the spoon, in the position of FIGS. 1, 4 and 5, the hole 6 locates the center tines 9 for easy spinning of the fork about its axis and rolling up the spaghetti as shown in FIG. 1. The blunt outer tines 10 abutting against the bowl to each side of the opening 6 (see FIG. 4), locate the fork lengthwise, and the protrusion of the center tines 9 into and through the opening 6 is sufficient so that the fork has no tendency to slip out of the hole 6 in use.

As will be apparent, the fork may be used in the ordinary way without appreciable inconvenience, as the greater length of the center tines is obvious to the eye and is automatically taken into account by the user in handling other food with the fork by itself.

The center hole 6 permits drainage of excess liquid sauce while not permitting the passage of any substantial quantity of solid or thick sauce components.

The fork when in the position of FIG. 6 will remain in place and can be held along with the spoon by the fingers of one hand, permitting the use of a knife in the other hand for cuting off any excess spaghetti.

What is claimed is:

1. A spaghetti fork and spoon combination comprising a spoon having an opening located substantially centrally and at the deepest part of the bowl, and a fork having center tines fitting the said opening with clearance, and a pair of blunt shorter outer tines, the width between an edge of the center tine portion of the fork and the tip of the outer tine on the far side thereof, being greater than the diameter of the said opening in the spoon bowl, whereby the outer tines limit movement of the center tines through the said opening and provide a bearing support as the fork is rotated to roll up the spaghetti.

2. A spaghetti fork and spoon combination comprising a spoon having an opening located substantially centrally and at the deepest part of the bowl, and a fork having center tines fitting the said opening with clearance, and a pair of blunt shorter outer tines, the width between an edge of the center tine portion of the fork and the tip of the outer tine on the far said thereof, being greater than the diemeter of the said opening in the spoon bowl, whereby the outer tines limit movement of the center tines through the said opening and provide a bearing support as the fork is rotated to roll up the spaghetti, and the protrusion of the center tines beyond the outer tines being comparable to the diameter of the bowl opening, whereby the tips of the center tines engaging under an edge of the opening and the blunt tips of the outer tines engaging the bowl surface to each side of the bowl opening support the fork in a slant position.

References Cited in the file of this patent

UNITED STATES PATENTS

| 1,539,669 | Hauser | May 26, 1925 |
| 2,853,779 | Lordo | Sept. 30, 1958 |